May 17, 1938.  M. P. NELSON  2,117,905

TRANSPORTATION DEVICE

Filed Feb. 3, 1937

INVENTOR.
M. P. NELSON
BY
ATTORNEYS

Patented May 17, 1938

2,117,905

UNITED STATES PATENT OFFICE 2,117,905

TRANSPORTATION DEVICE

Martin P. Nelson, Rutherford, N. J.

Application February 3, 1937, Serial No. 123,761

3 Claims. (Cl. 280—50)

The invention relates to transportation devices and more particularly to units for transporting liquids as exemplified, for instance, by milk, from one place to another which in the case of milk would be for example from the so-called country plant to a pasteurizing and distributing plant located in a distant city or other place. The object of the invention is to provide a transporting device or unit of predetermined capacity and of maximum mobility designed to reduce the transportation of the commodity for which it is intended to an operation of maximum simplicity. The invention contemplates further the provision of a device of the indicated type capable of being manually manipulated with a minimum of effort, which will eliminate the necessity for repeated handling of the commodity, and avoid harmful disturbance of said commodity while in transit. Other objects will appear from the description hereinafter and the features of novelty will be pointed out in the claims.

Figure 1:
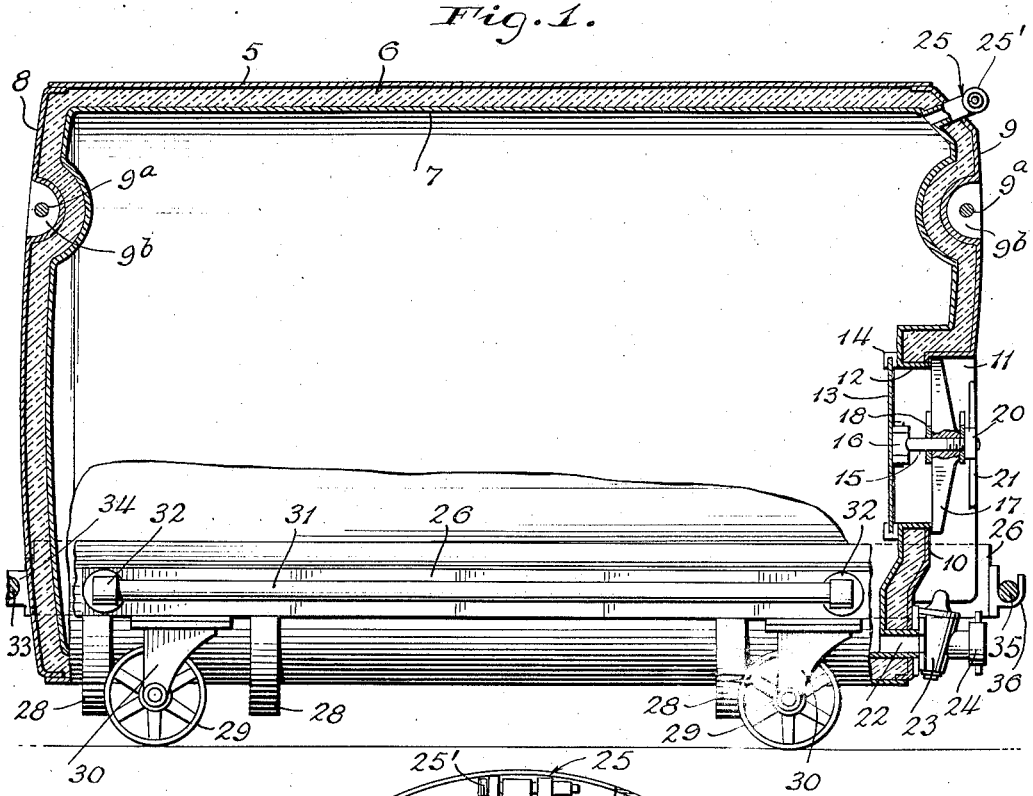
Figure 2:
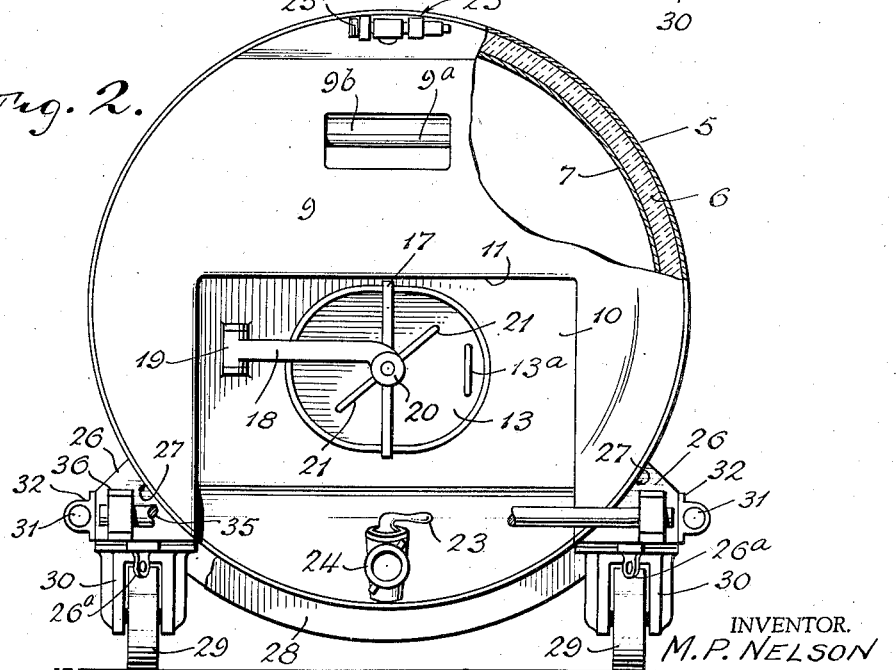

In the accompanying drawing which illustrates an example of the invention without defining its limits, Fig. 1 is a longitudinal sectional view of the novel transportation device or unit, and Fig. 2 is an end elevation thereof with parts broken away.

The illustrated example, selected for purposes of disclosure and description and without intent to define the limits of the invention, shows the novel transportation device or unit in a form designed to transport milk for instance from the so-called country plant which receives the milk from the dairy farmers to a pasteurizing and distributing plant located in a distant city or other place. It will be obvious that the novel device or unit is not restricted to the transportation of milk and that it may be utilized for transporting other liquids from place to place with equal efficiency and corresponding advantages; in addition, it is obvious that the novel device or unit may be adapted for the transporting of materials other than liquids. The description and claims are to be construed accordingly.

The novel transportation device shown in the drawing comprises a unit consisting of a tank 5 provided interiorly with suitable insulation 6 to protect the interior of the tank 5 from the effects of external temperature conditions. The tank 5 is further lined with a shell 7 of stainless steel, glass or other material which does not harmfully affect the milk or other commodity transported in the unit, and thus comprises outer and inner shells 5 and 7 spaced apart with an intermediate layer of insulating material 6 located between said shells 5 and 7. In the selected example the tank 5 is of cylindrical shape with the rear end wall 8 and adjacent insulation 6 and shell 7 thereof curved outwardly, and the front wall 9 and contiguous insulation 6 and shell 7, which may also be curved outwardly, provided with a depressed section 10 forming a front-end recess 11 as shown in Figs. 1 and 2. In practice provision is made to permit ingress to the interior of the tank 5 for purposes of cleaning, repair and the like for instance by providing the depressed section 10 with a manhole or opening 12 sufficiently large to permit a human being to easily pass therethrough into the interior of the tank 5. The manhole or opening 12 normally is closed by means of a suitable closure or cover 13 preferably located in the interior of the tank 5 and sealed in any conventional manner to prevent leakage through the manhole or opening 12; for instance the closure or cover 13, as shown, may be provided with a peripheral sealing gasket 14 to guard against leakage. To facilitate manipulation of the closure or cover 13, a suitable handle 13a may be conveniently provided thereon for instance as illustrated in Fig. 2. Any convenient locking means may be provided for movably securing the closure or cover 13 in its operative, sealing position; as illustrated, the locking means may consist of a screw-threaded stem 15 pivotally connected at 16 with said closure or cover 13 and adapted to project through and beyond a suitable opening provided in a locking member 17. The latter in its operative position extends diametrically across the manhole or opening 12 and is of sufficient length to engage the outer surface of the depressed section 10 adjacent to said manhole or opening 12 as illustrated in the drawing; for convenience and to prevent misplacing thereof, the locking member may be carried by and is preferably pivoted upon an arm 18 pivotally attached at 19 to the outer face of the depressed section 10. The illustrated locking means further includes a locking nut 20 arranged for screw-threaded connection with the threaded end of the stem 15 and preferably provided with handles 21 projecting radially outward from said nut 20 to facilitate operation thereof. The commodity for which the unit is designed, such as milk, may be introduced and removed from the tank 5 at will in any convenient manner. Preferably, however, particularly when the unit is intended for transporting milk, the tank 5 may be provided with a pipe 22 extending through the depressed section 10 for instance at a lower point of the recess 11. The pipe 22 is controlled by means of any customary type of valve 23 capable of manual manipulation and further includes a conventional coupling device 24 for detachably connecting a tube or the like with said pipe 22. In addition, a suitable relief valve 25 is located at the upper portion of the tank 5, for instance at the forward end thereof, for automatically relieving air pressure in the tank 5 during filling, and for automatically admitting air to said tank 5 during the withdrawal of the contents therefrom. In some instances it may be desirable to introduce a pressure fluid into the tank 5 for instance to force the contents thereof out through the pipe 22. To permit this to be done the relief valve 25 may include a suitable coupling device 25' for connecting a pressure tube or the like with the interior of the tank 5.

To enable the unit to be readily moved about or in other words to provide the desired mobility and ease in handling the unit particularly within confined limits, the tank 5 is mounted upon a suitable carriage and preferably fixed in place thereon in any convenient manner.

In the illustrated example the carriage consists of side members 26 located in spaced parallel relation and provided with seats 27 curved to fit the cylindrical surface of the tank 5; correspondingly curved cross members 28 extend between and connect the side members 26 at spaced points and in co-operation with the seats 27 of the latter provide a cradle in which the tank 5 is supported and preferably fixed in any well-known way. The cradle is mounted upon wheels 29 which may include rubber tires, if desired, and in any case are of predetermined dimensions, as for instance diameters of from ten to twelve inches. To still further increase the mobility of the unit, the wheels 29 are mounted on ball or roller bearings in customary manner in brackets 30 which are in swiveled connection with the side members 26 of the aforesaid cradle. With this arrangement, the wheels 29 and their brackets 30 constitute swiveled devices or casters in which the wheels 29 in addition to rotating about their horizontal axes are pivotally adjustable with the brackets 30 about vertical axes relatively to the side members 26. By thus mounting the cradle the unit is not only easily moved about in the direction of the major axis of the tank 5, but is capable of being moved in directions transverse to said axis with little effort; at the same time, the direction of movement of the unit may be readily changed at will so that said unit may be efficiently moved about within confined spaces or areas. To facilitate the aforesaid manipulation of the unit, one or more suitable devices may be provided. For instance, the tank may include a grip or handle 9ᵃ preferably located within a recess 9ᵇ formed at one end of the tank as illustrated in Figs. 1 and 2; if desired a similar grip or handle 9ᵃ may be correspondingly arranged in a similar recess 9ᵇ at the opposite end of the tank. Obviously the handle 9ᵃ need not be located in a recess such as the recess 9ᵇ at opposite ends of the tank and if desired may simply be attached to the outside end walls thereof.

In the preferred form suitable provision is made to protect the tank 5 against injury from impacts and to guard the device from other harmful conditions developed during handling thereof or while said device is in transit. This protecting means, as illustrated, may comprise side bars or bumpers 31 mounted in brackets 32 on the side members 26 and extending lengthwise thereof, a cross-bar or bumper 33 extending across the rear end of the cradle and being secured in brackets 34 fixed upon the ends of the side members 26, and a cross-bar or bumper 35 extending across the front end of said cradle; in the preferred form, the cross-bar 35 is mounted in brackets 36 carried upon the ends of the side members 26 so as to be easily removable from said brackets 36 and replaceable therein to facilitate access to the coupling device 24 or the valve 23 or both. The arrangement and dimensions are such that the bumper-bars 31, 33 and 35 are located beyond the confines of the tank 5 and thus serve to absorb any impacts and to otherwise protect the tank 5 from injury during use and in transit.

In practice the tank 5 is of outside dimensions predetermined by the use for which the device or unit is designed and predicated, for instance, upon the size of an opening through which the tank 5 is to pass, and upon a predetermined factor exemplified, for instance, by a space in which the device or unit is to be accommodated. In the selected example which is designed specially for transporting milk, the dimensions of said tank 5 may accordingly be determined by the dimensions of a customary railroad milk car and more particularly with reference to the size of the door openings of such cars. Milk cars of the type in question belonging to one of the well-known railway systems have an inside width of approximately nine feet two and one-half inches, and door openings which generally are about four feet six inches wide and about six feet two inches high. It will be understood that these dimensions are not controlling excepting in determining the dimensions of the tanks 5 intended to be transported in the given milk cars or their equivalent; in other words, in the case of milk transportation, the dimensions of the device and more particularly of the tank 5 thereof, will change in harmony and accordance with any changes in the dimensions of cars other than those quoted above.

With cars of the selected dimensions, the tank 5 will have an outside diameter, and the device or unit will have a height to enable the same to pass easily through the indicated door openings of the milk car. The axial length of the tank 5 designed for use with cars of the indicated interior width will be about eight feet so that the unit or device may easily be accommodated within said car with the tank 5 in a transverse position therein. The tank 5, instead of being cylindrical in shape, may be of rectangular cross-section with rounded internal corners, or said tank 5 may be oval, elliptical or otherwise shaped in cross-section.

The tank 5, which may have a predetermined capacity for instance of one thousand gallons, may directly receive the milk supplied by the dairy farmers at the country plant, or the milk may be introduced into the tank 5 from a holding tank at the country plant by connecting a tube or its equivalent leading from the supply of milk, with the pipe 22 through the medium of the coupling device 24. The milk in the latter instance may be passed into the tank 5 by gravity or it may be pumped or otherwise introduced through the pipe 22; when the tank 5 has been filled or received a predetermined quantity of milk, the valve 23 is closed. It will be understood that prior to its introduction either directly into the tank 5 or first into the holding tank, the milk is subjected to the customary treatment at the country plant, such as testing, weighing, cooling etc. At the proper time the loaded unit is manually propelled through the door of the milk car and shifted to a position therein with the tank 5 extending transversely of the car. Successive units are similarly propelled through the car door and shifted to a corresponding position within said car, so that finally the latter will be filled to capacity with filled units located side by side and with all of the tanks 5 extending transversely of the car. If necessary, the units may be secured in safe riding positions within the car in any convenient manner as by means of suitable brakes acting on the wheels 29 or by chains or the like attached to the carriages and convenient parts of the car, or the chains or their equivalent may be used to supplement the holding action of the brakes. To enable the chains or their equivalent, when used, to be easily attached to the units, the latter may be provided with eye-bolts 26ª depending, for instance, from the side members 26 as shown in Fig. 1; it will be obvious that the eye-bolts 26ª may be located upon other convenient portions of the units and also that said eye-bolts 26ª may be replaced by other suitable devices.

When the car reaches its destination, the filled units or devices are successively removed from the car through the door thereof for transfer, for instance, to a pasteurizing and distributing plant. Throughout the transportation to the final destination the milk remains in the tanks 5 and is removed therefrom only at the pasteurizing plant at the convenience of those in charge at such plant. The removal of the milk from the tanks 5 may be accomplished in any convenient manner as by means of a suitable pump coupled to the pipe 22, or by introducing a pressure medium through the valve 25, and said milk may be transferred from the tanks 5 directly to the pasteurizing tanks or their equivalent.

When the tanks 5 have been emptied, the closure 13 may be unlocked and removed to permit a person to pass through the manhole or opening 12 to the interior of said tank 5 for the purpose of cleaning the same. As all interior parts of the tank 5 are readily accessible to the cleaner, this cleaning operation may be performed in a most thorough and efficient manner, so that the device may always be readily maintained in a sanitary condition.

If desired, the milk supplied to the country plant by the dairy farmers may as previously stated, be emptied directly into the tanks 5 of the novel device in which case said tanks 5, in addition to functioning as shipping tanks also serve as holding or receiving tanks and thereby do away with the customary holding containers which, under existing conditions, generally receive the milk at the country plant for subsequent transfer therefrom.

By locating the valve 23 and the locking elements associated with the closure or cover 13 within the recess 11 at the forward end of the tank 5, said valve 23 and said locking elements are arranged within the confines of the tank 5 which accordingly is free from projecting elements tending to interfere with the manipulation of the units and to increase the space necessary to accommodate the same; the novel units are thus very compact and accordingly may be compactly positioned in contiguous relation to each other for instance within a given milk car so that the interior space thereof is utilized to a maximum degree.

In transferring milk from the dairy farm to a destination exemplified, for instance, by a pasteurizing plant located at a distant point, it has been the custom for the dairy farmers to deliver the milk to a so-called country plant where such milk, generally speaking, is temporarily stored in a holding tank or other receptacle. In transporting the milk from the country plant, it has long been the custom to transfer the milk from the previously mentioned holding tank to individual cans which, generally speaking, have a capacity for instance of forty quarts each. These cans with the milk therein were then transferred to railroad milk cars or other vehicles for conveyance to a predetermined destination as exemplified, for instance, by a station or terminal of the aforesaid railroad car or other vehicle; during such transportation the cans were required to be heavily iced in order to properly preserve the milk during such transit. From the aforesaid station or terminal the individual cans were conveyed by means of a suitable truck or other conveyance to the above mentioned destination as exemplified, for instance, by the pasteurizing plant from which the pasteurized milk was delivered to the ultimate consumers or to dealers of milk for resale to such consumers after having previously been bottled in the conventional manner. This method of transporting the milk required this commodity to be handled successively many times and in addition, required the individual handling of the relatively large number of containers for a given quantity of milk, as exemplified by the aforesaid forty quart cans.

In order to overcome the many objections existing in the type of transportation described above, the individual forty quart cans or their equivalent were superseded by railroad cars provided, for instance, with two large tanks each having, for instance, a capacity of 3000 gallons into which tanks the milk was introduced from the holding tank at the so-called country plant and then delivered to a station or other terminal of the railroad to which the tank car belonged. In some cases instead of the tank car, the milk was transported to a destination in a tank truck generally of the automotive type into which the milk was transferred from the holding tank at the country plant. In the case of the railroad tank car, when the terminal was reached, the milk was transferred from the tanks of said tank car, for instance, into the tank of a tank truck and delivered by this vehicle to the pasteurizing plant. While the tank car and tank truck possess many advantages over the long established and accepted practice of can transportation, the method of transporting milk by tank car or tank truck still possesses many inherent disadvantages such as the necessity for expensive special equipment and the multiplicity of successive handlings of the milk which was required in the several transferring operations.

The instant novel unit whereby the milk is transported for instance from the so-called country plant to the pasteurizing plant overcomes all of the disadvantages and objections of the can transportation and the tank car and tank truck transportation and reduces the operation of transporting the milk from the dairy farmer to the pasteurizing plant to an operation of maximum simplicity in which the necessity for repeated handling of the milk is eliminated and harmful disturbance of the milk while in transit is avoided.

This is particularly true when the milk is delivered by the dairy farmers to the country plant and at this plant is introduced directly into the tanks 5 of the novel device or unit hereinbefore described. In this latter instance, the unit in addition to serving as a holding or receiving tank serves also as a shipping tank and in such case obviates the necessity for pumping the milk to a holding tank for later transfer to a tank car or tank truck. Furthermore, if the instant novel device or unit is used as a holding or receiving tank at the country plant, it avoids the necessity for a special holding tank at such country plant and results in one handling of the milk from the time of scaling and other customary treatment after receipt from the dairy farmer, until ready for pasteurization in the pasteurizing plant. This method of handling the milk establishes service without requiring the installation of special facilities outside of the country plant as exemplified, for instance, by sewage, drainage and other equipment.

Because of the relatively smaller size of the tanks 5 comprising part of the novel device or unit, such tanks will more often be completely filled with milk thereby avoiding undesirable agitation and movement of the milk en route as is generally the case in tank cars or tank trucks only partially filled with the milk; this lessens to a marked degree the breaking down of fat globules in the milk and results in many other advantages. Because of the relatively small size of the unit and due to its being mounted upon the swiveled or caster type of wheels, the device or unit may be easily moved about in country and other plants as well as in cars and upon trucks. In addition, the size of the unit or device makes it just as adaptable to the small milk company as to the large company; because of the large investment necessarily involved in the ownership or rental of tank cars and tank trucks, such small milk companies under existing conditions are often discouraged and reluctant to undertake bulk transportation of milk from place to place as indicated above.

With the novel device or unit coupling and uncoupling of the tank connection as well as cleaning of the interior and exterior of the tanks may be accomplished under cover, for instance, within a milk plant, thereby providing sanitary conditions of maximum efficiency and preventing contamination by outside elements. The use of the unit or device also dispenses entirely with rail terminal agitation and pumping together with the objectionable consequences resulting therefrom.

The novel device or unit involves only the cleaning of a single tank as against the present necessity for cleaning the holding tank at the country plant, the tank cars and tank trucks, and the immediate tank-truck cleaning when diverting the same, for instance, for the holding of grade "A" milk after having immediately prior thereto been used for handling grade "B" milk. The transporting of the novel device or unit from the railroad or other terminal to the pasteurizing plant may be accomplished by a vehicle available for all types of service by the owner such as an automotive truck rather than as at present by means of a special vehicle as exemplified, for instance, by a tank truck which because of its specific construction, can be used only for bulk or tank milk handling. In the case of tank trucks, if delays occur in unloading for instance at the pasteurizing plant, expensive equipment is temporarily tied up, while with the instant novel device or unit when such delay occurs, the equipment which is tied up is much less expensive; at the same time the temporary tie-up of the instant novel device does not interfere with the continued and independent use of the transporting vehicles whereby the novel devices or units are conveyed. The novel device or unit furthermore dispenses with the relatively large investment in tank cars and tank trucks which is now required and avoids also the expense of repairs and maintenance of such tank cars and truck as well as the necessity for providing and maintaining the customary agitators, motors, filters, and unloading equipment, etc.

The novel device or unit provides a safe, sanitary and convenient system of handling the milk from country plant to pasteurizing plant or its equivalent and meets all of the requirements of the boards of health and other official bodies having jurisdiction.

While the novel device or unit is particularly designed for and especially adapted to the transporting of milk and its related commodities in the manner set forth hereinbefore, it is obvious that said device or unit may be used with equal efficiency and advantages for the transportation of other liquids as well as materials which are not liquid.

Various changes in the specific forms shown and described may be made within the scope of the claims without departing from the spirit of the invention.

I claim:

1. A unitary vehicle for transporting liquids in a railway freight car comprising a tank having means of access for cleaning said tank, means for filling and emptying said tank substantially within the marginal limits of said tank, said tank dimensioned in axial length proportional to a predetermined factor as exemplified by the interior width of a railway freight car, and dirigible wheels mounted beneath said tank, said wheels being in all positions substantially within the marginal limits of said tank.

2. A unitary vehicle for transporting liquids in a railway freight car comprising a tank having means of access for cleaning said tank, means for filling and emptying said tank substantially within the marginal limits of said tank, said tank dimensioned in axial length to a predetermined factor as exemplified by the interior width of a railway freight car, said tank dimensioned in width to another predetermined factor, as exemplified by the width of the door opening of a railway freight car, and dirigible wheels mounted beneath said tank, said wheels being in all positions substantially within the marginal limits of said tank.

3. A unitary vehicle as claimed in claim 1, said tank having a bumper extending substantially around the marginal limits of said tank, the outer edges of said bumper extending but slightly beyond the marginal limits of said tank.

MARTIN P. NELSON.